United States Patent
Croak et al.

(10) Patent No.: US 7,843,841 B2
(45) Date of Patent: *Nov. 30, 2010

(54) METHOD AND APPARATUS FOR PROVIDING AUTOMATIC CRANKBACK FOR EMERGENCY CALLS

(75) Inventors: Marian Croak, Fair Haven, NJ (US); Hossein Eslambolchi, Los Altos Hills, CA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 55 days.

This patent is subject to a terminal disclaimer.

(21) Appl. No.: 12/259,226

(22) Filed: Oct. 27, 2008

(65) Prior Publication Data

US 2009/0052633 A1    Feb. 26, 2009

Related U.S. Application Data

(63) Continuation of application No. 11/322,522, filed on Dec. 31, 2005, now Pat. No. 7,447,160.

(51) Int. Cl.
*G01R 31/08* (2006.01)

(52) U.S. Cl. .............. 370/242; 370/218; 370/225; 370/248; 370/250; 370/252; 379/1.04; 379/7; 379/10.01; 379/14.01; 379/15.05; 379/16; 379/18; 379/35

(58) Field of Classification Search ............. 370/218, 370/225, 242, 248, 250, 352; 379/1.04, 7, 379/10.01, 14.01, 15.05, 16, 18, 35; 455/404.1, 455/423; 709/224, 228–229
See application file for complete search history.

(56) References Cited

U.S. PATENT DOCUMENTS

| | | | |
|---|---|---|---|
| 3,851,122 A | 11/1974 | Gibson | |
| 4,959,849 A | 9/1990 | Bhusri | |
| 5,101,451 A | 3/1992 | Ash et al. | |
| 5,239,570 A * | 8/1993 | Koster et al. | 379/45 |
| 5,339,351 A * | 8/1994 | Hoskinson et al. | 379/45 |
| 5,359,646 A | 10/1994 | Johnson et al. | |
| 5,479,473 A | 12/1995 | Zey | |
| 5,771,274 A | 6/1998 | Harris | |
| 6,147,965 A | 11/2000 | Burns et al. | |
| 6,230,006 B1 * | 5/2001 | Keenan et al. | 455/424 |
| 6,466,648 B1 * | 10/2002 | Ikeno et al. | 379/9 |
| 6,529,583 B2 | 3/2003 | Creamer et al. | |
| 6,704,287 B1 | 3/2004 | Maharram | |
| 7,069,483 B2 | 6/2006 | Gillies et al. | |
| 7,260,186 B2 | 8/2007 | Zhu et al. | |
| 7,447,160 B1 | 11/2008 | Croak et al. | |
| 2002/0154646 A1 | 10/2002 | Dubois et al. | |

* cited by examiner

*Primary Examiner*—Hemant Patel

(57) ABSTRACT

A method and apparatus for automating test procedures to determine if non-emergency signaling message processing errors impact emergency calls, e.g., E911 calls, are disclosed. In one embodiment, the present method alerts network engineers so that crankback procedures to alternative routes can be instituted when these E911 call impacting error conditions are detected in a network.

20 Claims, 5 Drawing Sheets

METHOD AND APPARATUS FOR PROVIDING AUTOMATIC CRANKBACK FOR EMERGENCY CALLS

CROSS-REFERENCES TO RELATED APPLICATIONS

The present application is a continuation of U.S. patent application Ser. No. 11/322,522 filed on Dec. 31, 2005 now U.S. Pat. No. 7,447,160 (currently allowed), which is herein incorporated by reference.

The present invention relates generally to communication networks and, more particularly, to a method and apparatus for providing automatic crankback for emergency calls, e.g., Enhanced 911 (E911) calls, in communication networks, e.g., packet networks such as Voice over Internet Protocol (VoIP) networks.

BACKGROUND OF THE INVENTION

VoIP network providers are required to provide Enhanced 911 (E911) services that are equivalent in reliability and performance to the Public Switched Telephone Network (PSTN) counterpart. Failure to complete call setup of these emergency calls due to a network condition can have serious or even fatal consequences. Errors in processing non-emergency signaling messages that impact non-emergency calls can have a critical impact on the reliability of E911 calls as well. There is a need to identify signaling message processing that impacts E911 calls so that the network service provider can take actions to minimize such impacts.

Therefore, a need exists for a method and apparatus for providing automatic crankback for emergency calls, e.g., Enhanced 911 calls, in a packet network, e.g., a VoIP network.

SUMMARY OF THE INVENTION

In one embodiment, the present invention provides a method for automating test procedures to determine if non-emergency signaling message processing errors impact emergency calls, e.g., E911 calls. The present invention provides a method for alerting network engineers so that crankback procedures to alternative routes can be instituted when these E911 call impacting error conditions occur in a network.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
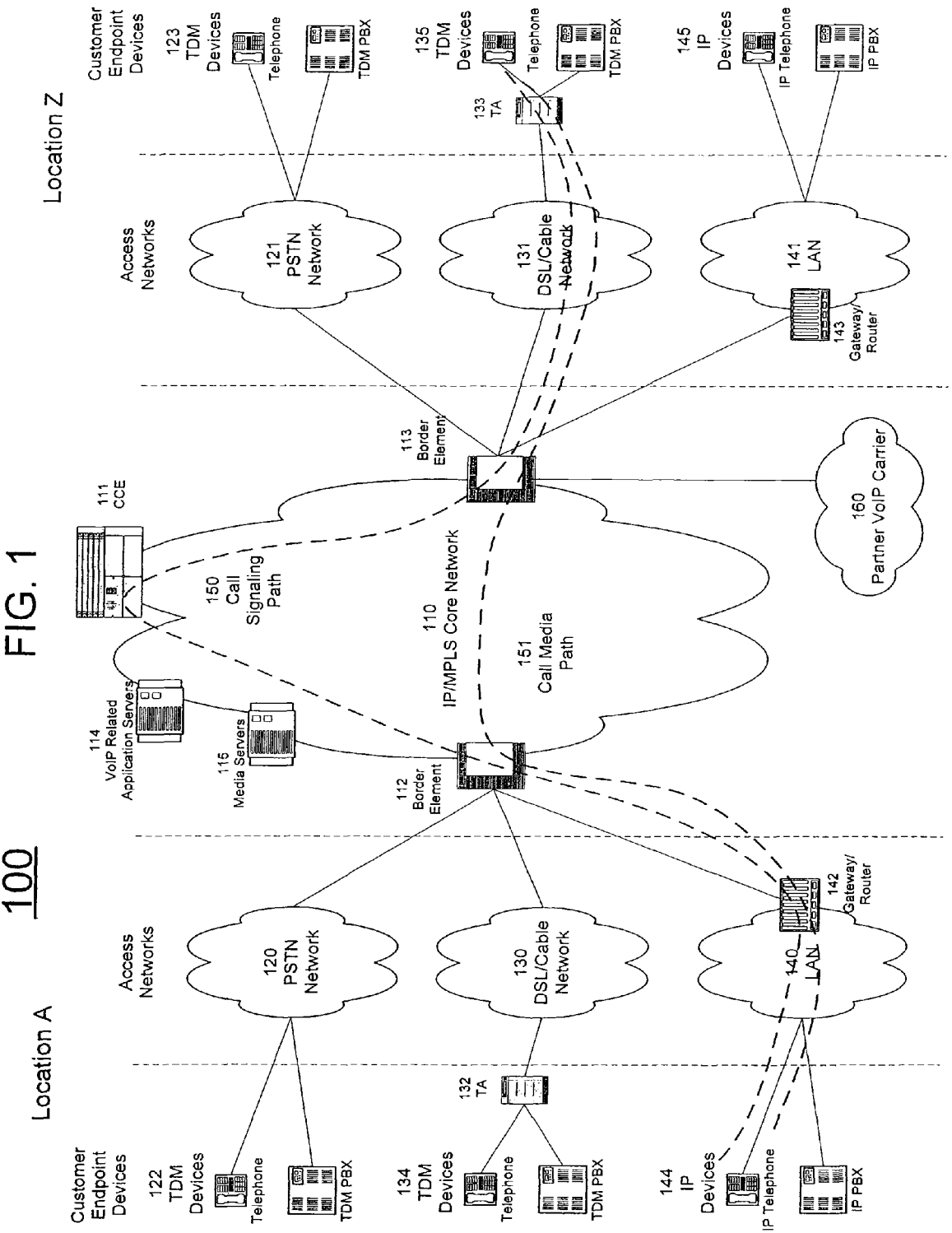
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

VoIP network providers are required to provide Enhanced 911 (E911) services that are equivalent in reliability and performance to the Public Switched Telephone Network (PSTN) counterpart. Failure to complete call setup of these emergency calls due to a network condition can have serious or even fatal consequences. Errors in processing non-emergency signaling messages that impact non-emergency calls can have a critical impact on the reliability of E911 calls as well. There is a need to identify signaling message processing that impacts E911 calls so that the network service provider can take actions to minimize such impacts.

To address this need, the present invention provides a method for automating test procedures to determine if non-emergency signaling message processing errors impact emergency calls, e.g., E911 calls. The present invention provides a method for alerting network engineers so that crankback procedures to alternative routes can be instituted when these E911 call impacting error conditions occur in a network.

Figure 2:
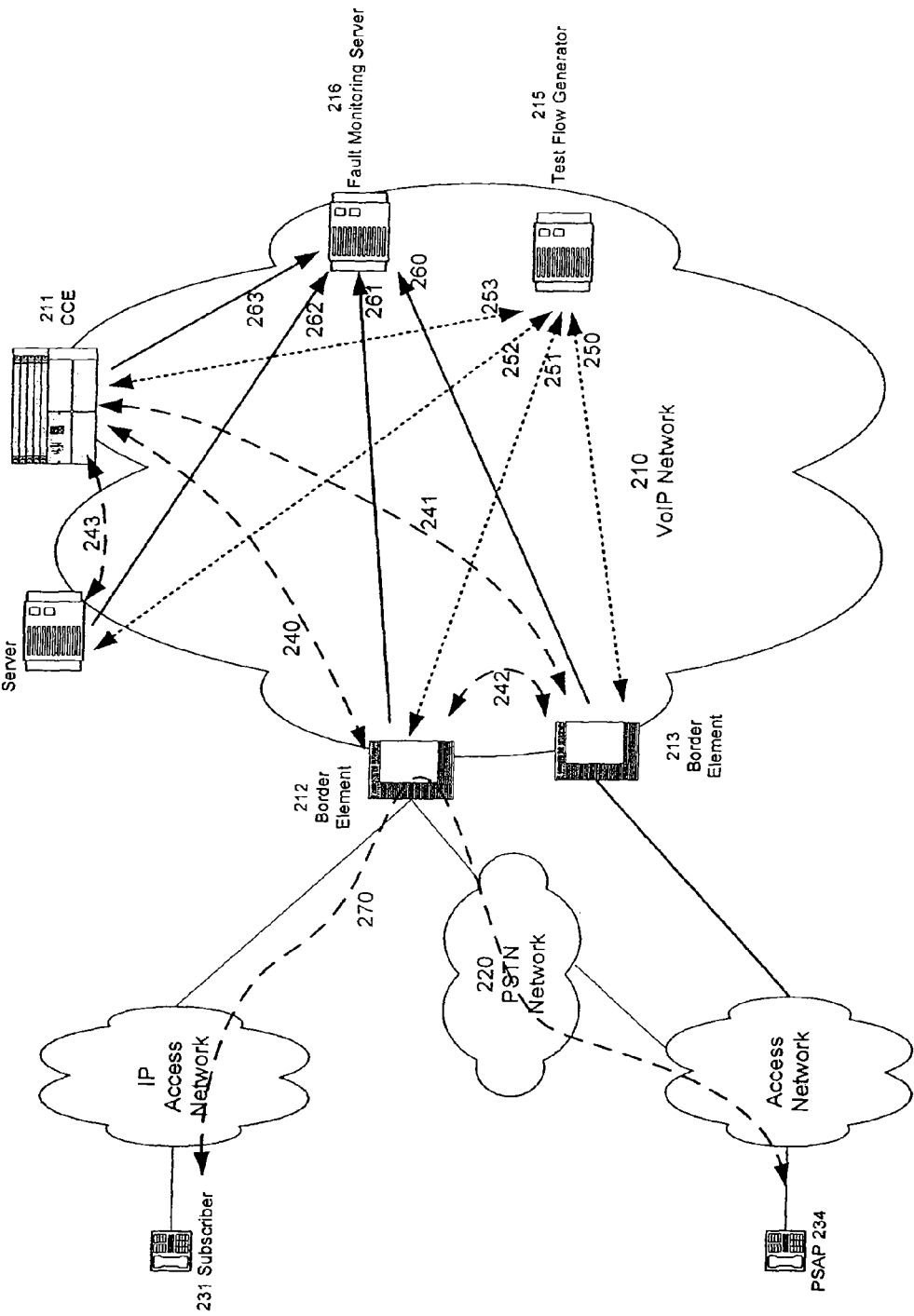
FIG. 2 illustrates an example of providing automatic crankback for emergency calls, e.g., Enhanced 911 (E911) calls, in a VoIP network of the present invention.

FIG. 2 illustrates an example 200 of providing automatic crankback for emergency calls, e.g., Enhanced 911 (E911) calls, in a packet network, e.g., a VoIP network of the present invention. In FIG. 2, Test Flow Generator 215 generates test call flows in VoIP network 210. For instance, Test Flow Generator 215 injects test call signaling message errors into VoIP network 210 as part of an automated testing process to identify potential impacts of the injected call signaling message errors. In addition, Test Flow Generator 215 injects test E911 calls into the VoIP network to see the impacts on E911 calls, such as E911 call failures, i.e., evaluating the effect of the injected test call signaling message errors on the injected E911 calls.

For instance, Test Flow Generator 215 injects test call signaling message errors in BE 213 via flow 250, injects test call signaling message errors in BE 212 via flow 251, injects test call signaling message errors in AS 214 via flow 252, and injects test call signaling message errors in CCE 211 via flow 253. The injected test call signaling message errors result in test call flows represented by flows 240, 241, 242, and 243. For instance, an injected call signaling message error in BE 212 may result in a test call flow between BE 212 and CCE 211 being generated, such as flow 240.

Test Flow Generator 215 monitors the behaviors of injected test call flows, via flows 250 to 253, to identify test call signaling message error that causes an impact on E911 calls. When an injected test call signaling message error causes an impact on an E911 call, the injected test call signaling message error will be identified as a specific error to be added to a compile list of errors that impact E911 call processing in VoIP network 210. Once a list of test call signaling message errors has been compiled, Test Flow Generator 215 sends the compiled list to Fault Monitoring Server 216.

Fault Monitoring Server 216 uses the received list of test call signaling message errors compiled by Test Flow Generator 215 to continuously monitor the occurrences of these identified errors in VoIP network 210 via flows 260 to 263. When a specified error in the compiled list is detected by Fault Monitoring Server 216, Fault Monitoring Server 216 will raise an alarm to warn the network operator of the detected signaling message error. Fault Monitoring Server 216 also automatically activates crankback procedures to ensure that E911 calls will be completed reliably to the intended PSAP. In one embodiment, Fault Monitoring Server 216 will instruct the appropriate network elements, such as the originating BE, to crankback incoming E911 calls received by VoIP network 210 to a PSTN for call completion. For instance, subscriber 231 places an E911 call and the E911 call setup message is sent to BE 212 for processing. Since the crankback procedures are currently activated by Fault Monitoring Server 216, the E911 call setup message will be routed immediately to PSTN network 220 to be forwarded to PSAP 234 using flow 270 for call completion.

Figure 3:
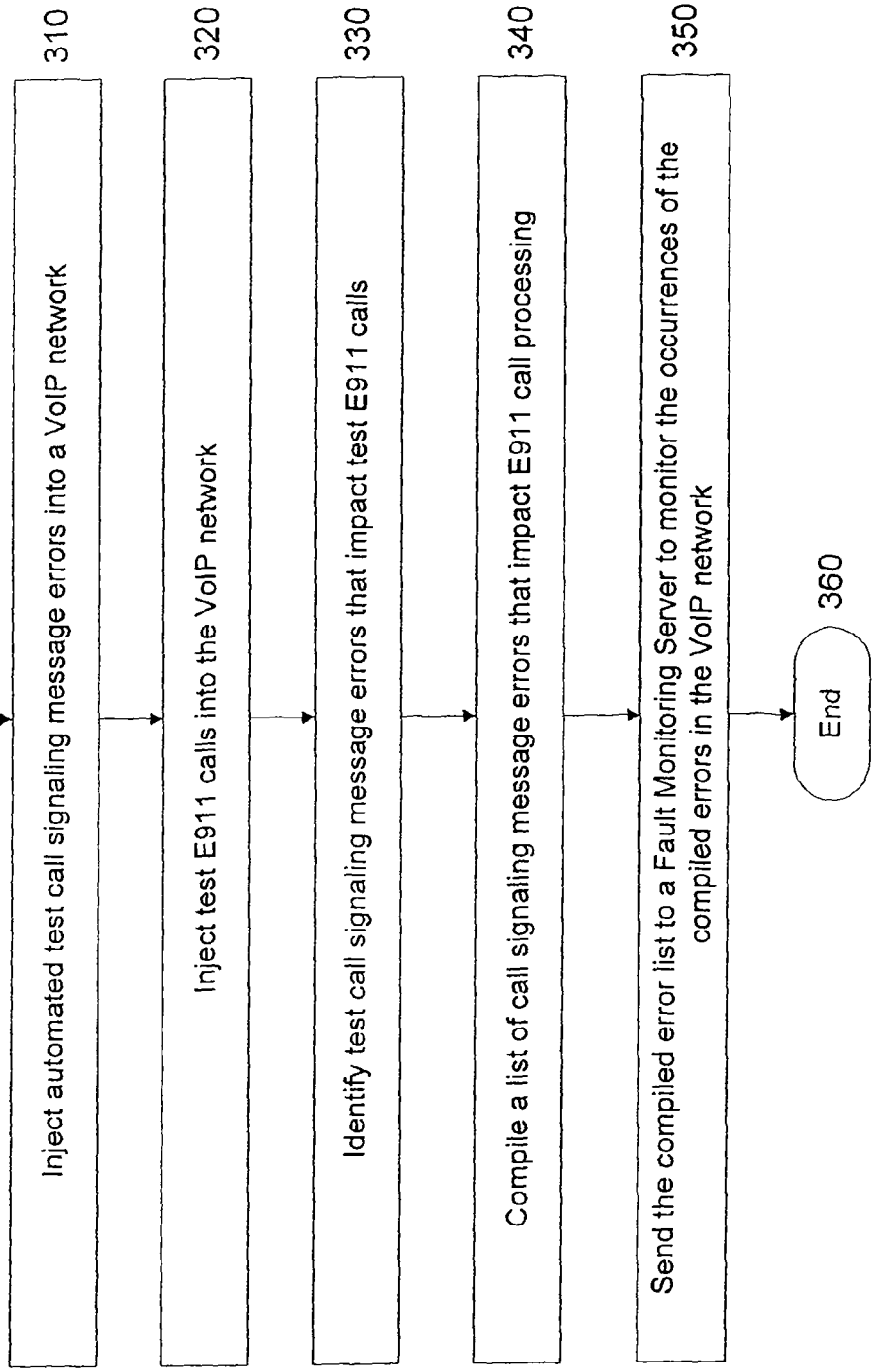
FIG. 3 illustrates a flowchart of a method for identifying signaling message errors that impact emergency calls, e.g., Enhanced 911 (E911) calls, in a packet network, e.g., a VoIP network, of the present invention.

FIG. 3 illustrates a flowchart of a method 300 for identifying signaling message errors that impact emergency calls, e.g., Enhanced 911 (E911) calls, in a packet network, e.g., a VoIP network, of the present invention. Method 300 starts in step 305 and proceeds to step 310.

In step 310, the method injects automated test call signaling message errors into a VoIP network. The test call signaling message errors are injected by a Test Flow Generator.

In step 320, the method injects test E911 calls into the VoIP network. The test E911 calls are injected by the Test Flow Generator.

In step 330, the method identifies test call signaling message errors that impact test E911 calls. The test call signaling message errors are identified by the Test Flow Generator.

In step 340, the method compiles a list of all test call signaling message errors that impact test E911 calls. The list of all test call signaling message errors is compiled by the Test Flow Generator.

In step 350, the method sends the compiled error list to a Fault Monitoring Server to monitor the occurrences of the compiled errors in the VoIP network. The compiled error list is sent by the Test Flow Generator. The method ends in step 360.

Figure 4:
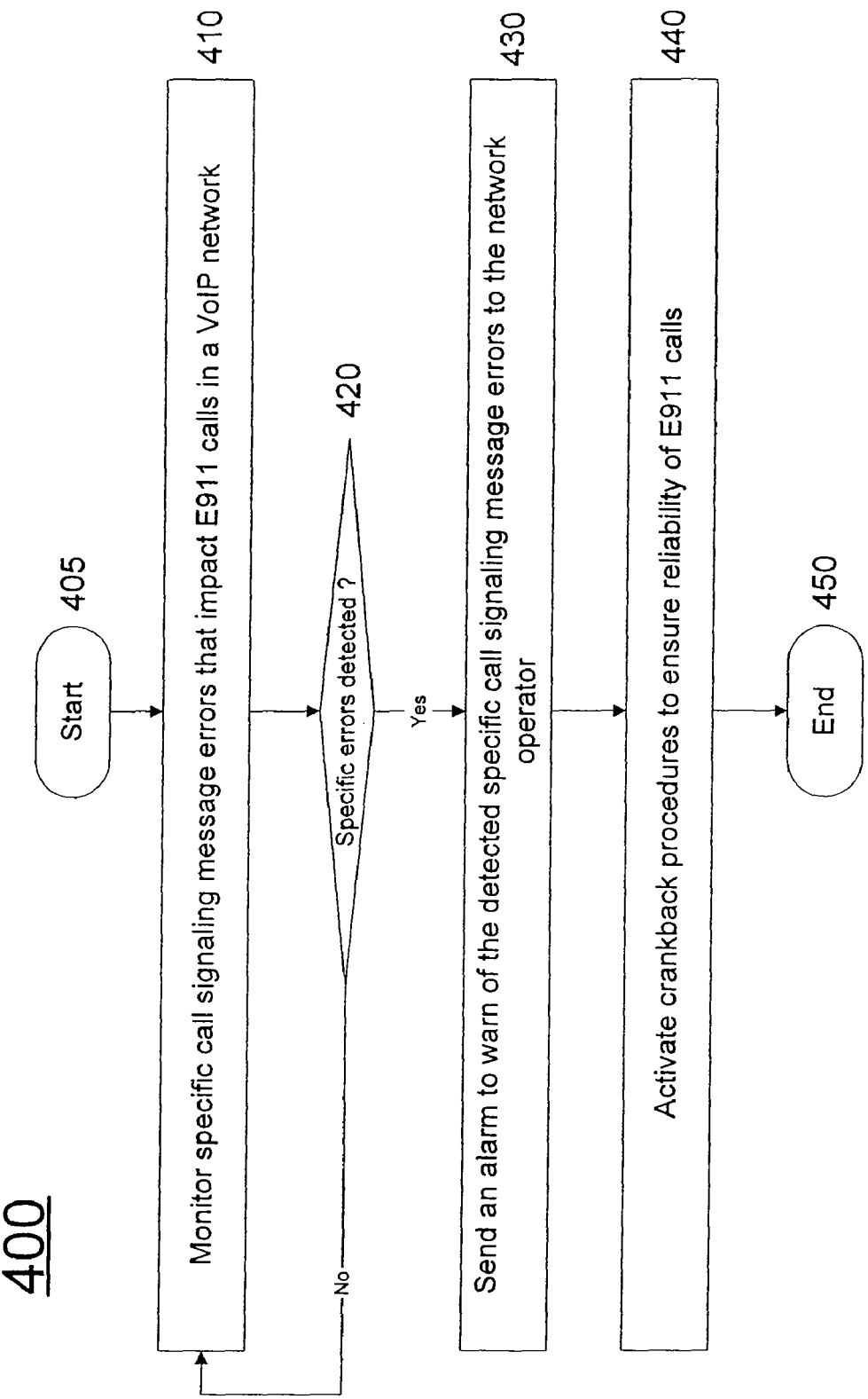
FIG. 4 illustrates a flowchart of a method for providing automatic crankback for emergency calls, e.g., Enhanced 911 (E911) calls, in a packet network, e.g., a VoIP network, of the present invention.

FIG. 4 illustrates a flowchart of a method 400 for providing automatic crankback for emergency calls, e.g., Enhanced 911 (E911) calls, in a packet network, e.g., a VoIP network, of the present invention. Method 400 starts in step 405 and proceeds to step 410.

In step 410, the method monitors specific call signaling message errors that impact E911 calls in a packet network, e.g., VoIP network. A Fault Monitoring Server monitors the specific call signaling message errors using an error list compiled and identified by the Test Flow Generator.

In step 420, the method checks if a specific call signaling message error that impacts E911 calls is detected. If a specific call signaling message error that impacts E911 calls is detected, the method proceeds to step 430; otherwise, the method proceeds back to step 310.

In step 430, the method sends an alarm to warn the network operator of the detected specific call signaling message errors.

In step 440, the method activates crankback procedures to ensure the reliability of E911 calls handled by the network. In one embodiment, the Fault Monitoring Server will instruct the appropriate network elements, such as an originating BE, to crankback incoming E911 calls received by VoIP network 210 to a PSTN for call completion. The method ends in step 450.

Figure 5:
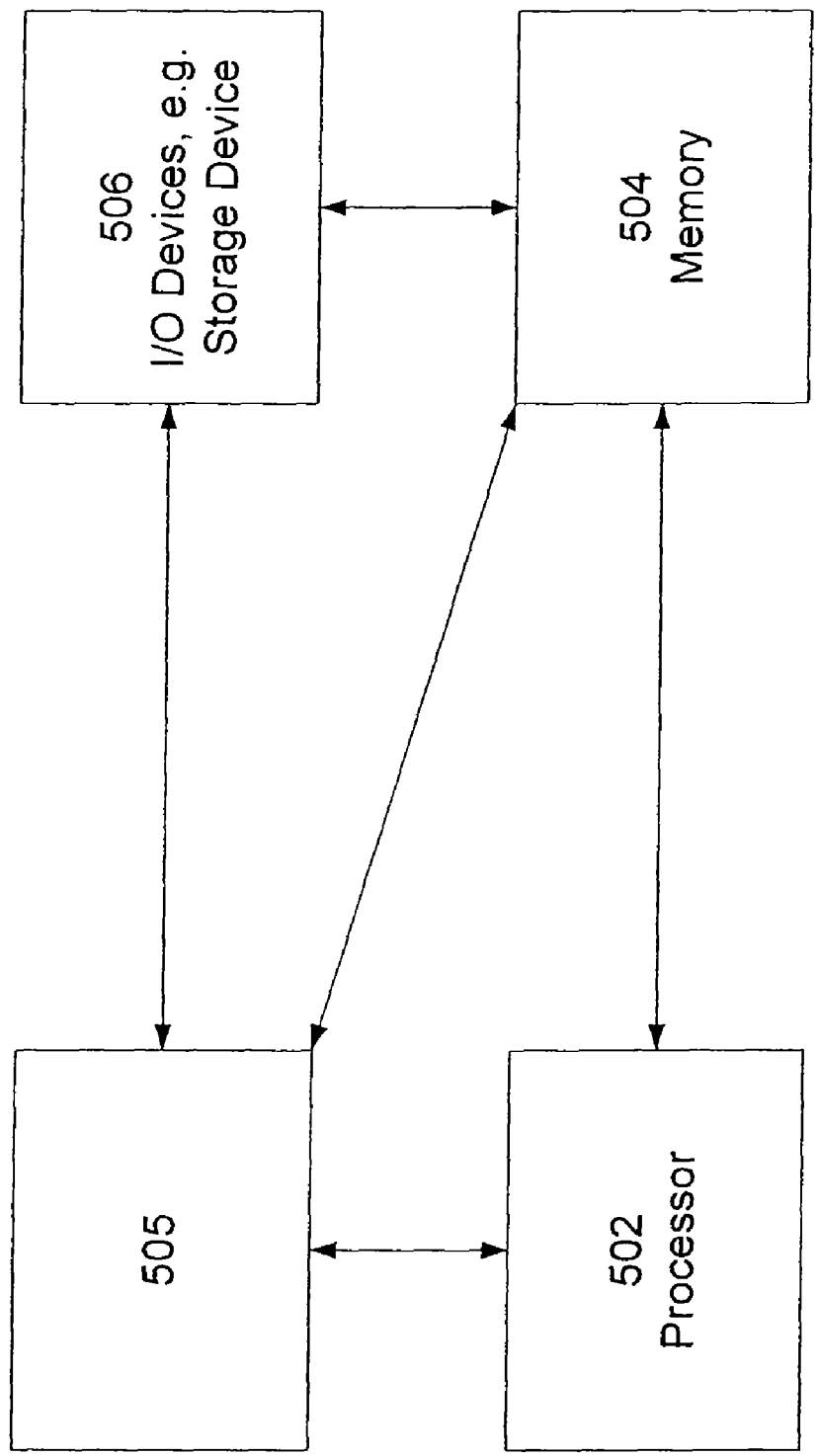
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing automatic crankback for emergency calls, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for providing automatic crankback for emergency calls can be loaded into memory 504 and executed by processor 502 to implement the functions as discussed above. As such, the present process 505 for providing automatic crankback for emergency calls (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing automatic crankback for an emergency call in a communication network, comprising:
    identifying a call signaling message error that impacts emergency call processing, wherein the identifying comprises:
        injecting a plurality of test signaling message errors into the communication network;
        injecting a test emergency call into the communication network; and
        identifying at least one of the test signaling message errors that caused a negative impact on processing of the test emergency call; and
    activating an automatic crankback procedure if the call signaling message error is detected in the communication network.

2. The method of claim 1, wherein the communication network is an internet protocol network.

3. The method of claim 1, wherein the emergency call is an enhanced 911 call.

4. The method of claim 1, wherein the call signaling message error is identified by a test flow generator via an automated test.

5. The method of claim 1, further comprising:
    compiling a list of the plurality of test signaling message errors that caused the negative impact on processing the test emergency call.

6. The method of claim 1, wherein the at least one of the test signaling message errors that caused the negative impact is identified by monitoring resulting test call flows generated by the injected plurality of test signaling message errors.

7. The method of claim 1, wherein the call signaling message error that impacts emergency call processing is monitored by a fault monitoring server.

8. The method of claim 1, wherein the activating comprises:
    sending an alarm to warn a network operator of detection of the call signaling message error that impacts emergency call processing; and
    instructing an originating border element via an instruction to reroute all incoming emergency calls via a public switched telephone network.

9. The method of claim 8, wherein the instruction to reroute is provided by a fault monitoring server.

10. A computer-readable medium having stored thereon a plurality of instructions, the plurality of instructions including instructions which, when executed by a processor, cause the processor to perform a method for providing automatic crankback for an emergency call in a communication network, comprising:
  identifying a call signaling message error that impacts emergency call processing, wherein the identifying comprises:
    injecting a plurality of test signaling message errors into the communication network;
    injecting a test emergency call into the communication network; and
    identifying at least one of the test signaling message errors that caused a negative impact on processing of the test emergency call; and
  activating an automatic crankback procedure if the call signaling message error is detected in the communication network.

11. The computer-readable medium of claim 10, wherein the communication network is an internet protocol network.

12. The computer-readable medium of claim 10, wherein the emergency call is an enhanced 911 call.

13. The computer-readable medium of claim 10, wherein the call signaling message error is identified by a test flow generator via an automated test.

14. The computer-readable medium of claim 10, further comprising:
  compiling a list of the plurality of test signaling message errors that caused the negative impact on processing of the test emergency call.

15. The computer-readable medium of claim 10, wherein the at least one of the test signaling message errors that caused the negative impact is identified by monitoring resulting test call flows generated by the injected plurality of test signaling message errors.

16. The computer-readable medium of claim 10, wherein the call signaling message error that impacts emergency call processing is monitored by a fault monitoring server.

17. The computer-readable medium of claim 10, wherein the activating comprises:
  sending an alarm to warn a network operator of detection of the call signaling message error that impacts emergency call processing; and
  instructing an originating border element via an instruction to reroute all incoming emergency calls via a public switched telephone network.

18. The computer-readable medium of claim 17, wherein the instruction to reroute is provided by a fault monitoring server.

19. An apparatus for providing automatic crankback for an emergency call in a communication network, comprising:
  means for identifying a call signaling message error that impacts emergency call processing, wherein the means for identifying comprises:
    means for injecting a plurality of test signaling message errors into the communication network;
    means for injecting a test emergency call into the communication network; and
    means for identifying at least one of the test signaling message errors that caused a negative impact on processing of the test emergency call; and
  means for activating an automatic crankback procedure if the call signaling message error is detected in the communication network.

20. The apparatus of claim 19, wherein the communication network is an internet protocol network.

* * * * *